US009531737B2

(12) United States Patent
Stählin

(10) Patent No.: US 9,531,737 B2
(45) Date of Patent: Dec. 27, 2016

(54) METHOD AND VEHICLE-TO-X COMMUNICATION SYSTEM FOR SELECTIVELY CHECKING DATA SECURITY SEQUENCES OF RECEIVED VEHICLE-TO-X MESSAGES

(75) Inventor: Ulrich Stählin, Eschborn (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 54 days.

(21) Appl. No.: 14/008,268

(22) PCT Filed: Mar. 28, 2012

(86) PCT No.: PCT/EP2012/055523
§ 371 (c)(1),
(2), (4) Date: Sep. 27, 2013

(87) PCT Pub. No.: WO2012/130888
PCT Pub. Date: Oct. 4, 2012

(65) Prior Publication Data
US 2014/0020098 A1   Jan. 16, 2014

(30) Foreign Application Priority Data

Mar. 29, 2011 (DE) ......................... 10 2011 006 305
Mar. 27, 2012 (DE) ......................... 10 2012 204 880

(51) Int. Cl.
G08B 23/00 (2006.01)
H04L 29/06 (2006.01)
(Continued)

(52) U.S. Cl.
CPC ........... H04L 63/1408 (2013.01); G08G 1/163 (2013.01); H04L 63/123 (2013.01); H04L 65/4061 (2013.01); H04L 67/12 (2013.01)

(58) Field of Classification Search
CPC .... H04L 63/123; H04L 29/06; H04L 63/1408; G08G 1/163; G08G 1/166
(Continued)

(56) References Cited

U.S. PATENT DOCUMENTS 4,665,395 A * 5/1987 Van Ness ............ G07C 9/00111
340/5.25
6,647,270 B1 11/2003 Himmelstein
(Continued)

FOREIGN PATENT DOCUMENTS

DE 10 2004 056 724 A1 5/2006
DE 10 2007 053 255 A1 5/2009
(Continued)

OTHER PUBLICATIONS

German Examination Report—May 21, 2012.
(Continued)

Primary Examiner — Abu Sholeman
(74) Attorney, Agent, or Firm — Brinks Gilson & Lione

(57) ABSTRACT

A method for selectively checking data security sequences of received vehicle-to-X messages, in which a number of the vehicle-to-X messages are received and/or sent in an operating cycle of a vehicle-to-X communication system. In an operating cycle, a reliability assessment of the received vehicle-to-X message is performed by checking the data security sequence, an information content of the received messages is read without prior checking of the data security sequence. In the operating cycle, a subset of the number of received vehicle-to-X messages is selected on the basis of the information contents, and solely the data security sequences of selected vehicle-to-X messages are checked. This results in the advantage that a reliability assessment is no longer carried out on all the received vehicle-to-X messages before they are processed, thereby enabling a
(Continued)

reduction in the checking capacity that must be reserved for checking the data security sequence.

14 Claims, 2 Drawing Sheets

(51) Int. Cl.
    *G08G 1/16*     (2006.01)
    *H04L 29/08*     (2006.01)
    *G06F 17/00*     (2006.01)

(58) Field of Classification Search
    USPC .......................................... 726/22, 1, 23, 26
    See application file for complete search history.

(56) References Cited

U.S. PATENT DOCUMENTS

| | | | |
|---|---|---|---|
| 7,039,708 B1* | 5/2006 | Knobl | B60R 25/04 709/203 |
| 8,909,927 B2* | 12/2014 | Falk | G08G 1/0962 709/206 |
| 2007/0026876 A1* | 2/2007 | Freilich | G08G 1/20 455/461 |
| 2007/0124599 A1* | 5/2007 | Morita | B60R 25/25 713/186 |
| 2007/0160206 A1* | 7/2007 | Ostrander | B60R 25/2072 380/203 |
| 2009/0047929 A1 | 2/2009 | Chesnutt | |
| 2009/0133121 A1* | 5/2009 | Falk et al. | G08G 1/0962 726/22 |
| 2009/0254754 A1 | 10/2009 | Bellur et al. | |
| 2010/0049976 A1 | 2/2010 | Karnik | |
| 2010/0087981 A1* | 4/2010 | Orozco-Perez | H04L 67/18 701/29.5 |
| 2010/0102928 A1* | 4/2010 | Chang | H04N 7/188 340/5.72 |
| 2010/0173603 A1* | 7/2010 | Kwak | B60W 30/0956 455/404.1 |
| 2011/0221901 A1* | 9/2011 | Bai | H04L 69/04 348/148 |
| 2011/0238997 A1 | 9/2011 | Bellur et al. | |
| 2011/0304425 A1 | 12/2011 | Iyer et al. | |
| 2012/0204059 A1* | 8/2012 | Preston | B60R 25/00 714/10 |
| 2012/0209474 A1* | 8/2012 | Morris | B62D 1/046 701/42 |
| 2014/0143834 A1* | 5/2014 | Stahlin | H04L 67/12 726/3 |

FOREIGN PATENT DOCUMENTS

| | | |
|---|---|---|
| DE | 10 2010 002 092 A1 | 12/2010 |
| DE | 10 2011 004 505 A1 | 8/2011 |
| DE | 10 2010 038 640 A1 | 2/2012 |

OTHER PUBLICATIONS

PCT International Search Report—Aug. 29, 2012.
Dr. Hariharan Krishnan; "Verify-on-Demand"—A Practical and Scalable Approach for Broadcast Authentication in Vehicle Safety Communication; Oct. 2, 2008; http://ip.com/IPCIOM/000175512.

* cited by examiner

METHOD AND VEHICLE-TO-X COMMUNICATION SYSTEM FOR SELECTIVELY CHECKING DATA SECURITY SEQUENCES OF RECEIVED VEHICLE-TO-X MESSAGES

CROSS REFERENCE TO RELATED APPLICATIONS

This application claims priority to German Patent Application Nos. 10 2011 006 305.6, filed Mar. 29, 2011, 10 2012 204 880.4, filed Mar. 27, 2012, and PCT/EP2012/055523, filed Mar. 28, 2012.

FIELD OF THE INVENTION

The invention relates to a method for selectively checking data security sequences of received vehicle-to-X messages, a system for selectively checking data security sequences of received vehicle-to-X messages, and the use thereof.

BACKGROUND

Vehicle-to-X communication systems which are suitable for information transmission both between different vehicles (vehicle-to-vehicle communication) and between vehicles and infrastructure facilities (vehicle-to-infrastructure communication) are already known in the prior art. Both variants are usually grouped under the generic term "vehicle-to-X communication". The transmitted vehicle-to-X data may be of a safety-critical nature and cause an autonomous intervention by a vehicle system in the vehicle control system. Accordingly, strict demands for data security and reliability are placed at least on the safety-critical vehicle-to-X data in order to protect a recipient from maliciously manipulated data and hence from control interventions based on false information.

DE 10 2010 038 640 A1 describes in this connection a device and a method for vehicle-to-X communication. The disclosed method is based on a combination of communication technologies, each of which is different and has different properties. A first communication channel can be implemented e.g. as a mobile communication channel, whereas a second communication channel is implemented as a WLAN channel. Which type of information is sent over which communication channel is determined by sender-based sorting of the information to be sent. According to DE 10 2010 038 640 A1, periodically occurring or static information is transmitted over the first channel, whereas safety-relevant information is transmitted over the second channel.

DE 10 2011 004 505 A1 discloses a method for secure vehicle-to-X communication. The reliability of a vehicle-to-X message is in this case checked, for example, by measuring the position and/or speed of the sender and by subsequently comparing the measured information with the information contained in the vehicle-to-X message. If a difference is identified, the received vehicle-to-X message is classified as unreliable and handled accordingly. By using the method described in DE 10 2011 004 505 A1 it is possible to send e.g. the "cooperative awareness messages" as they are known without a cryptographic data security structure thereby not only making the sent messages up to 80% shorter but also reducing the electronic computing power required for the data security check.

DE 10 2010 002 092 A1 describes data processing for received vehicle-to-X messages, which processing precedes forwarding of the messages to the associated applications and systems in the vehicle and processing of same by these applications and systems. Such data processing can comprise checking a security level of the message and additionally perform a data reduction process. The data reduction process causes information about certain objects or situations to be suppressed and hence said information is not forwarded and processed. Thus, for instance, information about objects located too far from the receiving vehicle or information about objects that are only reached by the vehicle after a certain period of time is ignored. Likewise, a large number of spatially close objects having fundamentally the same response to a situation are combined e.g. into a traffic jam. It is also possible to take account solely of objects located in the intended channel of movement of the vehicle. The amount of data to be processed by the individual applications can thereby be reduced significantly.

It is probable from current efforts that a PKI-based (Public Key Infrastructure) data security method will be used for the large-scale introduction of vehicle-to-X communication systems, which method draws on what are known as elliptic curves as cryptographic algorithms. Although such a security method has the advantage that only relatively short digital key sequences are needed, it has the disadvantage that a relatively large amount of computing power must be expended on checking the key sequences. Since the vehicle-to-X communication methods known from the prior art additionally perform a check of a data security structure only according to permanently defined schemes, this inflexible manner of processing means that, taking into account the very high latency requirements for managing reliably under all circumstances a potentially arising computational load, dedicated processing units are essential, which in turn are associated with relatively high manufacturing costs.

Therefore the object of the present invention is to reduce the computational load for checking the data security sequences that arises in connection with receiving a multiplicity of vehicle-to-X messages while simultaneously guaranteeing a high data security standard.

INTRODUCTORY DESCRIPTION OF THE INVENTION

This object is achieved according to the invention by the method for selectively checking data security sequences of received vehicle-to-X messages.

According to the method according to the present invention for selectively checking data security sequences of received vehicle-to-X messages, a number of vehicle-to-X messages are received and/or sent in an operating cycle of a vehicle-to-X communication system, wherein a vehicle-to-X message comprises a data security sequence. In addition in the operating cycle, a reliability assessment of the received vehicle-to-X message is performed by checking the data security sequence, and in the operating cycle, an information content of the received vehicle-to-X messages is read without prior checking of the data security sequence. The method is characterized in that in the operating cycle, a subset of the number of received vehicle-to-X messages is selected on the basis of the information contents, and solely the data security sequences of selected vehicle-to-X messages are checked. This results in the advantage that a reliability assessment is no longer carried out on all the received vehicle-to-X messages before they are processed, thereby enabling a reduction in the checking capacity, in other words computing power, that must be reserved for checking the data security sequence. This results in a reduction in the manufacturing effort and manufacturing costs.

Selecting on the basis of the information content of a received vehicle-to-X message means that depending on the information content, it is possible to dispense with a check of the data security sequence. If the information content turns out to be irrelevant to the recipient anyway, there is no need to check the reliability of the associated vehicle-to-X message and hence of the information content, because the vehicle-to-X message will not be processed anyway. Conversely, vehicle-to-X messages that prove to have an information content that is relevant to the recipient are normally selected and hence checked in the current operating cycle.

Within the meaning of the invention, an operating cycle comprises the method steps of sending or receiving vehicle-to-X messages, reading the information contents, selecting the vehicle-to-X messages and checking the data security sequences (reliability assessment).

The vehicle-to-X messages usually additionally contain a pseudonym, which identifies the sender of the vehicle-to-X message. The pseudonym can hence be used to assign a plurality of received vehicle-to-X messages to a sender.

For reasons of data protection and for the purpose of maintaining the privacy of the sender, the pseudonym can be changed on a regular or irregular basis.

It is preferably provided that the selection on the basis of the information contents takes into account at least one of the following factors:

actual speed of the recipient,
relative speed of the recipient with respect to the sender,
activation status of driver assistance systems and/or comfort systems,
distance between the recipient and sender,
estimated time of entry of the sender into a critical zone around the recipient,
estimated time of intersection of the trajectories of motion of the sender and recipient,
estimated time of the recipient colliding with the sender,
orientation of the recipient with respect to the sender,
relative direction of travel of the recipient with respect to the sender, and
road classification, wherein the critical zone has an adaptable extent and outline, and wherein the road classification is made according to a permitted maximum speed and/or a lane width and/or separation of lanes and/or a number of lanes and/or a proximity to built-up areas and/or weather conditions. The factors "distance between the recipient and sender" and "relative direction of travel of the recipient with respect to the sender" for instance can be jointly taken into account so as to always select the sender that is closest to the recipient in the direction of travel. Taking these factors into account in the selection, or combining these factors in the selection, makes it easily possible to distinguish vehicle-to-X messages that may be relevant and hence must be selected from vehicle-to-X messages that are irrelevant to the recipient and accordingly do not need to be selected.

In addition, it is preferred that the selection on the basis of the information contents takes into account a comparison of the information contents with information contents of information detected by at least one surround sensor, wherein the vehicle-to-X messages having information contents which match the information contents of information detected by the at least one surround sensor are not selected. Received vehicle-to-X messages having information contents which can be confirmed by at least one surround sensor no longer need to be selected for checking the data security sequence because an alternative reliability assessment is also made by the comparison of the information contents without this relatively computationally intensive check. If the information contents match, it can be assumed that the vehicle-to-X message is reliable.

In a further preferred embodiment of the invention, it is provided that the selection on the basis of the information contents takes into account an intervention in the vehicle control system that will be actuated by a processing of the vehicle-to-X message, wherein the vehicle-to-X message that causes an intervention in the vehicle control system on being processed is always selected. This results in the advantage that the reliability is always assessed before processing vehicle-to-X messages, the processing of which causes an intervention in the vehicle control system and which are therefore highly safety critical. If the vehicle-to-X message is assessed as unreliable on the basis of the check of the data security sequence, processing of the message is prevented and consequently a possibly dangerous intervention in the vehicle control system based on unreliable information.

Furthermore it is advantageous that the selection on the basis of the information contents takes into account a driver warning that will be actuated by a processing of the vehicle-to-X message, wherein the vehicle-to-X message that causes a warning on being processed is always selected. Since a warning can actuate an action by the driver and hence by the vehicle, by selecting the vehicle-to-X message, if applicable an unnecessary warning is suppressed. At the same time, the driver is not unsettled by an incorrect or unnecessary warning.

The method according to the invention is preferably characterized in that the data security sequences are generated and allocated by a method based on an infrastructure for generating and allocating public keys, wherein the data security sequences are encrypted in particular by an elliptic curve algorithm. An infrastructure of this type for allocating and generating public keys is also known as a "public key infrastructure". A method based on a public key infrastructure for generating and allocating the data security sequences has the advantage that a central control station is present, which can withdraw a valid data security sequence from a sender that is demonstrably sending incorrect information deliberately. In addition, new data security sequences can be allocated regularly via the central station in order to reduce the risk that a data security sequence already in use for a relatively long time has been tampered with during this time and is now being misused to allocate deliberate misinformation. It is also easily possible to allocate to the individual communication users via the central station pseudonyms that change at regular or irregular intervals in order to guarantee the privacy of said users and to improve data protection. Using a cryptographic algorithm based on elliptic curves also has the advantage that the data security sequence to be sent has a relatively low data volume and hence only occupies a relatively small bandwidth of the transmission channel.

It is preferably provided that in the operating cycle, a selection correction that follows the selection and precedes the check is carried out if the subset of the vehicle-to-X messages selected on the basis of the information contents is greater than or less than the available checking capacity, wherein the selection correction fully utilizes an available checking capacity of the vehicle-to-X communication system. This results in the advantage that no checking capacity remains unused in the current operating cycle. If the selected subset does not fully utilize the available checking capacity, the statistical selection method can be a purely random, additional selection from the total number of vehicle-to-X messages that have not yet been selected in the current operating cycle. The subset corrected by the selection correction and selected for checking equals in this case the maximum number of vehicle-to-X messages or data security sequences that can be checked using the available checking capacity. In order to check a subset of data security sequences that fully utilizes the available checking capacity, the relevance of the individual information contents can be graduated extremely finely for the selection correction. For example, if there is sufficient checking capacity also available in the current operating cycle to check those vehicle-to-X messages that were not initially selected, these vehicle-to-X messages can also be selected by means of the selection correction. Conversely, if the selected subset exceeds the available checking capacity, this subset can be reduced by means of the selection correction by the selection correction confirming from the total number of vehicle-to-X messages already selected in the current operating cycle only a certain portion that corresponds to the available checking capacity. If a selection correction is carried out, this method step is added to the operating cycle.

For the case that in total fewer vehicle-to-X messages are received than it would be possible to check using the available checking capacity, this is an exception in which the available checking capacity is not utilized in full.

The available checking capacity is obtained from a computing power installed in the receiving vehicle-to-X communication system and earmarked for checking the data security sequence.

Particularly preferably, the selection correction based on a statistical selection method takes into account at least one of the following factors:

reception of more than one vehicle-to-X message from a specific sender in the same operating cycle, result of the reliability assessment of at least one vehicle-to-X message from the specific sender in at least one previous operating cycle, wherein on receiving more than one vehicle-to-X message from the specific sender, not all the vehicle-to-X messages from the specific sender are selected in the operating cycle, and wherein, depending on the result of the reliability assessment of at least one vehicle-to-X message from the specific sender in at least one previous operating cycle, a vehicle-to-X message received in the operating cycle from the specific sender is not selected. Hence the subset of vehicle-to-X messages to be checked is restricted by the selection correction in that only those vehicle-to-X messages can be selected that have not been sent by a sender from which the vehicle-to-X messages have already been checked previously. This in turn results in the advantage that preferably those vehicle-to-X messages are selected that have a comparatively higher probability of being unreliable, whereas conversely, those vehicle-to-X messages that have a comparatively high probability of being reliable are not selected. Taking into account the reliability assessments of vehicle-to-X messages received in a previous operating cycle from a specific sender can be restricted, for example depending on the situation, to two to ten previous operating cycles. Vehicle-to-X messages from the specific sender from which data security sequences of vehicle-to-X messages received in a previous operating cycle have already been selected and checked in one of the two to ten previous operating cycles, depending on the situation, are then not checked in the current operating cycle. It is equally possible to select only a single vehicle-to-X message from a number of vehicle-to-X messages received in the same operating cycle from a specific sender. If this single selected vehicle-to-X message has been checked and assessed as reliable, it can be assumed with a high level of probability that the vehicle-to-X messages received in the same operating cycle from the specific sender are likewise reliable. The checking effort can thereby be reduced further.

Furthermore it is preferred that the received vehicle-to-X messages are forwarded to at least one driver assistance system and processed by same, wherein the at least one driver assistance system is designed to warn a driver and/or to intervene in the vehicle control system and/or to override a driver instruction. This results in the advantage that the received vehicle-to-X messages can be used to avert danger situations and, if applicable, can even be used for immediate and autonomous accident prevention without involvement of the driver or countermanding a control input of the driver. The warning can be visual, acoustic and/or haptic, wherein for the visual warning an indicator in the dashboard, the rearview mirror, on the steering wheel or in the instrument panel is particularly suitable. The acoustic warning can be output e.g. via the in-vehicle loudspeaker of a car radio, and the haptic warning can be output in the form of vibrations, for instance via the steering wheel or the gas pedal.

The method according to the invention is also readily suitable for integrating additional selection steps of a similar selection method, so that the method according to the invention can be combined with similar methods or at least with a method aimed at a similar purpose.

In addition, the invention relates to a vehicle-to-X communication system for selectively checking data security sequences of received vehicle-to-X messages, which system includes a sending module and a receiving module, a checking module and a readout module. The sending module sends vehicle-to-X messages, and the receiving module receives vehicle-to-X messages, wherein in one operating cycle of the vehicle-to-X communication system, a number of vehicle-to-X messages are sent and/or received and/or read and/or checked, and wherein the vehicle-to-X messages each comprise a data security sequence. In the operating cycle, the readout module reads information contents of the received vehicle-to-X messages without prior checking of the data security sequence, and the checking module performs in the operating cycle a reliability assessment of the received vehicle-to-X messages by checking the one data security sequence in each message. The vehicle-to-X communication system is characterized in that a selection module is additionally provided, which in the operating cycle selects on the basis of the information contents a subset of the number of received vehicle-to-X messages. The system according to the invention hence includes all necessary means for implementing the method according to the invention and enables in a simple manner a reduction in the data security sequences to be checked of received vehicle-to-X messages. This results in the advantages already described.

The system is preferably characterized in that the sending module and/or the receiving module and/or the readout module and/or the selection module includes a shared chipset and in particular a shared processing unit. This results in the advantage that each of the modules does not need to be fitted with a dedicated processor or provided with a dedicated chipset, which both simplifies the manufacturing process and reduces the production costs. The shared access of different modules to the same chipset or the same processor also results in an efficient and fast data link between the modules.

It is preferably provided that the processing unit of the sending module and/or the receiving module and/or the readout module and/or the selection module is assigned to any one driver assistance system or vehicle control unit. The manufacturing process of the system according to the invention and the production costs can thereby be reduced further. For example, the processing unit of a control unit intended for the electronic stability control of the vehicle can be used by the readout module as long as no stability control intervention is being carried out. It is equally possible to use a processing unit of an airbag control unit e.g. for the selection module, as long as the airbag does not need to be released. Since such control units normally largely remain unused or underused while the vehicle is running, the thereby available, unused computing power can usefully be made available during this period to individual modules or a plurality of modules of the system according to the invention.

The system is preferably characterized in that the checking module includes a processing unit having a dedicated design for checking cryptographic algorithms based on elliptic curves. Since a cryptographic algorithm based on elliptic curves enables the advantage of a relatively small volume of data combined with relatively high data security, the use of the algorithm results in the advantages already described of reduced bandwidth occupancy of the transmission channel. On the other hand, the data processing of a cryptographic algorithm based on elliptic curves uses a relatively large amount of computing power, so that using a processing unit with a dedicated design makes it possible to achieve a faster reliability assessment.

It is preferably provided that the sending module and/or the receiving module is designed to send and/or receive the vehicle-to-X messages by means of at least one of the following connection types:

WLAN connection, in particular in compliance with IEEE 802.11,

ISM connection (Industrial, Scientific, Medical Band),

Bluetooth® connection,

ZigBee connection,

UWB connection (Ultra Wide Band),

WiMax® connection (Worldwide Interoperability for Microwave Access), infrared connection, and mobile communication connection.

These connection types offer various advantages here depending on the form, wavelength and data protocol used. Thus some of said connection types enable e.g. a relatively high data transmission rate and allow a connection to be established relatively quickly, whereas others are by far the best suited to data transmission around line-of-sight obstructions. The combination of a plurality of these connection types and the simultaneous or parallel use thereof result in further advantages because this can then compensate for disadvantages of individual connection types.

Furthermore, it is preferred that the vehicle-to-X communication system implements the method according to the invention. The advantages resulting from the method according to the invention have already been described in detail.

The system according to the invention can be modified or extended without particular difficulties to implement additionally a method that is similar to, or at least is aimed at a similar purpose to, the method according to the invention. For this purpose it will generally be sufficient to increase accordingly the computing power of individual modules or a plurality of modules.

In addition, the present invention relates to using the vehicle-to-X communication system for selectively checking data security sequences of received vehicle-to-X messages.

BRIEF DESCRIPTION OF THE DRAWINGS

Further preferred embodiments are given in the following descriptions of exemplary embodiments with reference to figures, in which.

DETAILED DESCRIPTION

Figure 1:
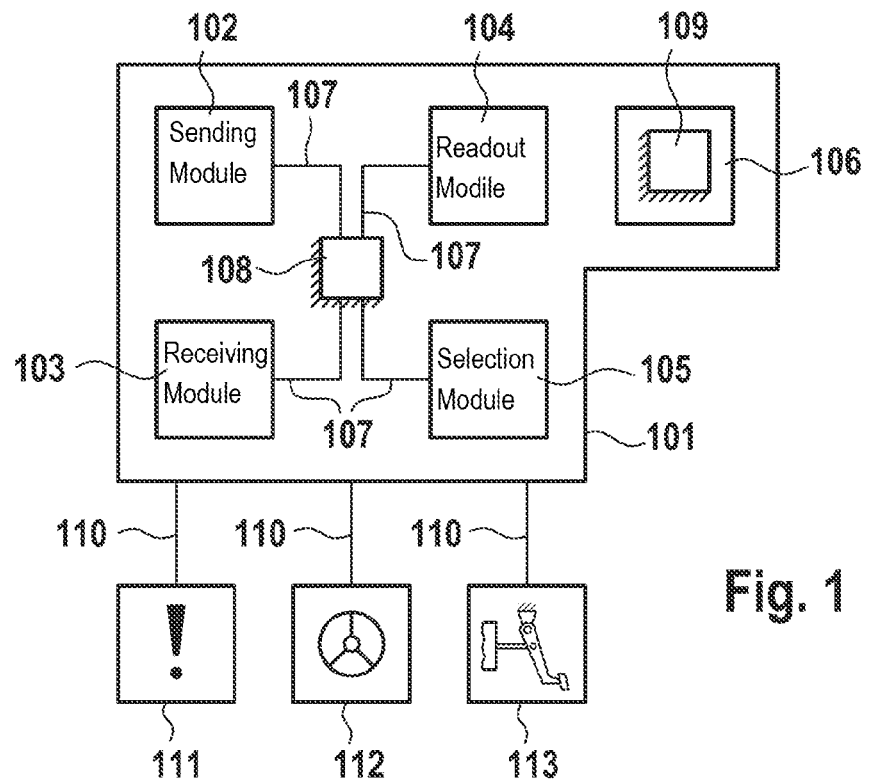
FIG. 1 shows a schematic layout of the vehicle-to-X communication system according to the invention.

FIG. 1 shows an example layout of vehicle-to-X communication system 101 according to the invention. Vehicle-to-X communication system 101 comprises sending module 102, receiving module 103, readout module 104, selection module 105 and checking module 106. Sending module 102, receiving module 103, readout module 104 and selection module 105 are connected to shared processing unit 108 via data connections 107. Checking module 106 itself includes processing unit 109 which has a dedicated design for checking cryptographic algorithms based on elliptic curves. Since a large amount of computing power must be expended on processing such algorithms, using dedicated hardware provides advantages of data processing efficiency in this case.

Vehicle-to-X messages are sent by sending module 102, and vehicle-to-X messages are received by receiving module 103. The vehicle-to-X messages are items of information about the vehicle status and items of information about the vehicle surroundings detected by surround sensors. Each vehicle-to-X message includes a data security sequence, and checking module 106 uses a check of the sequence to perform a reliability assessment of the vehicle-to-X message. Before checking module 106 checks a data security sequence, however, readout module 104 reads the information content of the associated vehicle-to-X message. Selection module 105 selects on the basis of the read information content a subset of the number of vehicle-to-X messages received in the current operating cycle. Since, for example, the selected subset of vehicle-to-X messages is not sufficient to utilize in full the available checking capacity, selection module 105 performs a selection correction, which is used for selecting further vehicle-to-X messages. The available checking capacity can thereby be utilized in full and no checking capacity is left unused. Checking module 106 then performs a reliability assessment on the finally selected vehicle-to-X messages by checking the included data security sequence. Vehicle-to-X communication system 101 is additionally coupled to driver assistance systems 111, 112 and 113 via data connections 110. Driver assistance system 111 is a warning facility for visual, haptic, and acoustic warning of the driver; driver assistance system 112 is a steering assistant, which can assist the driver by applying a steering moment to the steering wheel. In addition, steering assistant 112 can perform an autonomous steering intervention and override the driver. Driver assistance system 113 is a braking assistant, which can independently increase a braking moment entered by the driver, and furthermore is designed also to execute autonomous full and partial braking. Depending on the information contents of the received vehicle-to-X messages or on the reliability assessments thereof, received vehicle-to-X messages are forwarded to one or more of driver assistance systems 111, 112 and 113 and processed by same, or are not forwarded and discarded.

Figure 2:
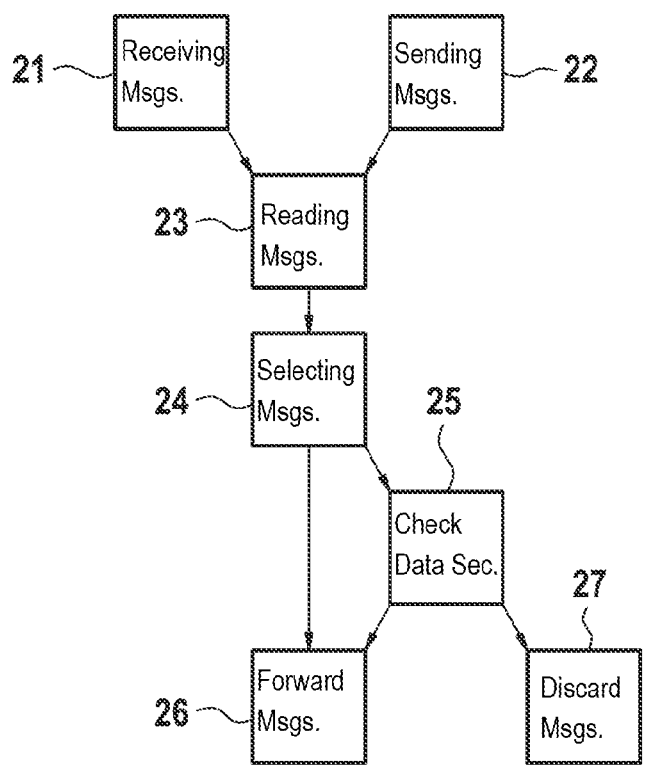
FIG. 2 shows a flow diagram containing an example sequence for the method according to the invention.

FIG. 2 shows a flow diagram containing an example sequence for the method according to the invention. All the method steps shown form in total a single operating cycle here. In method step 21, a number of vehicle-to-X messages are received, and in simultaneously executed step 22 a number of vehicle-to-X messages are sent. The sent and received vehicle-to-X messages each a data security sequence. Normally the number of received vehicle-to-X messages is greater than the number of sent vehicle-to-X messages because a recipient is surrounded by a multiplicity of senders. In method step 23, the information content of the received vehicle-to-X messages is read. In step 24, the vehicle-to-X messages are selected on the basis of this information content, wherein solely the data security sequences of selected vehicle-to-X messages are checked in the relevant operating cycle. The selection takes into account the following factors:

actual speed of the recipient, relative speed of the recipient with respect to the sender, activation status of driver assistance systems and/or comfort systems, distance between the recipient and sender, estimated time of entry of the sender into a critical zone around the recipient, estimated time of intersection of the trajectories of motion of the sender and recipient, orientation of the recipient with respect to the sender, relative direction of travel of the recipient with respect to the sender, and road classification.

The checking of the data security sequences of the selected vehicle-to-X messages and hence the reliability assessment of the vehicle-to-X messages takes place in method step 25. In step 26, the unselected vehicle-to-X messages are forwarded to the associated driver assistance systems without prior reliability assessment, and processed by same. If the result of the reliability assessment in step 25 is that a vehicle-to-X message is unreliable, this message is discarded in step 27. After checking the data security sequences of the selected vehicle-to-X messages in step 25, these vehicle-to-X messages are also forwarded in step 26 to the associated driver assistance systems, and processed by same.

Figure 3:
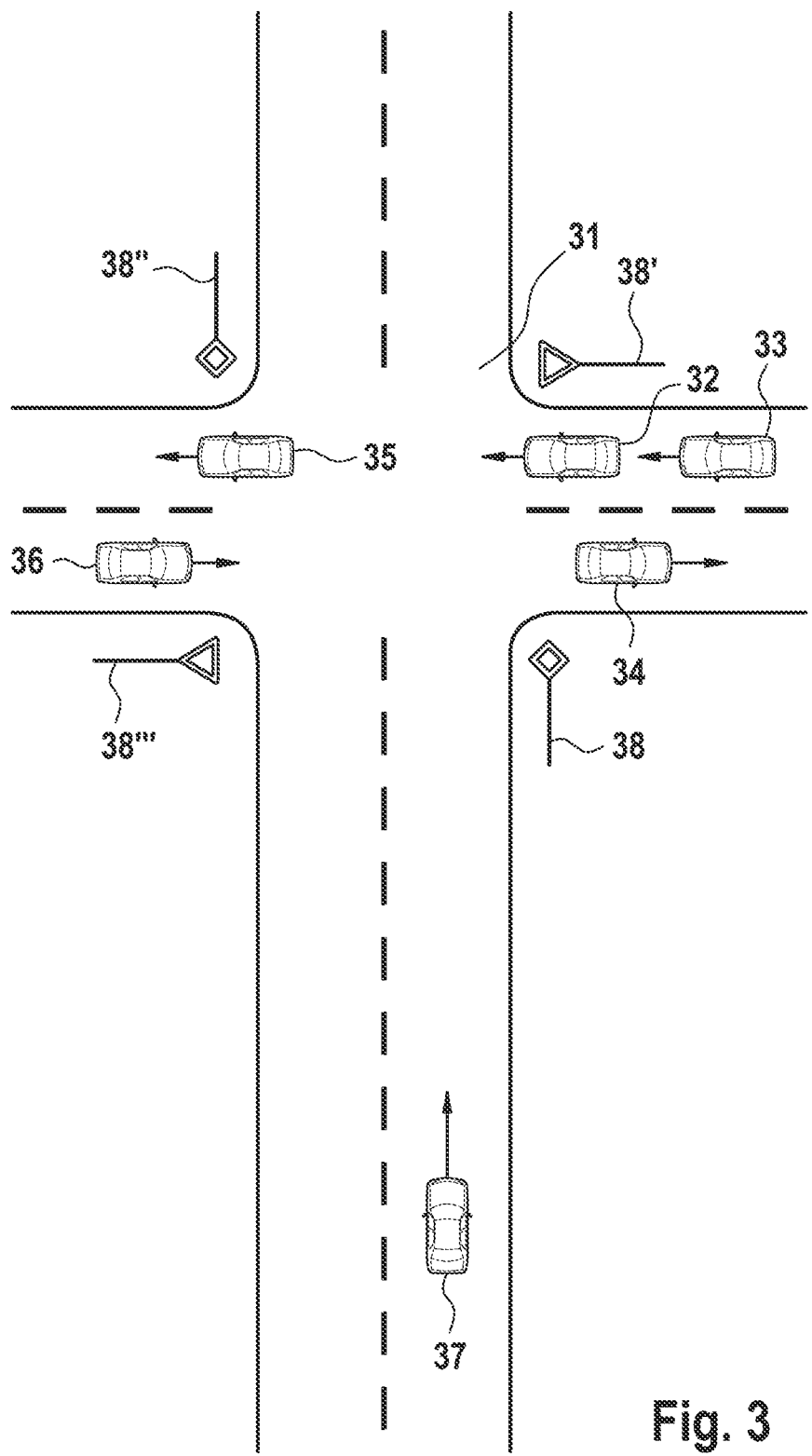
FIG. 3 shows a traffic situation in which the method according to the invention is used.

FIG. 3 shows a traffic situation in which the method according to the invention is used. It shows vehicles 32, 33, 34, 35 and 36 located at crossroads 31. Vehicle 37 is approaching crossroads 31 from some distance. The direction of travel of vehicles 32, 33, 34, 35, 36 and 37 is indicated by an arrow in each case. According to signage 38, 38', 38" and 38''' of crossroads 31, vehicles 32, 33 and 36 entering crossroads 31 must give way to vehicle 37.

By way of example, vehicle 33 is equipped with the vehicle-to-X communication system according to the invention. Vehicles 32, 33, 34, 35, 36 and 37 send vehicle-to-X messages in the form of "cooperative awareness" messages, each of which contains a piece of information about the speed, location and orientation of respective vehicles 32, 33, 34, 35, 36 and 37. In addition, all sent vehicle-to-X messages comprise a data security sequence, which the recipient can use for a reliability assessment of the vehicle-to-X message. Owing to the checking capacity available in vehicle 33, for example a maximum of three different vehicle-to-X messages can be checked per operating cycle of the vehicle-to-X communication system. In practice, the available checking capacity will be designed to be far higher, but is restricted to three vehicle-to-X messages per operating cycle in this exemplary embodiment in order to illustrate the invention clearly. Since the information contents of the received vehicle-to-X messages are read first before checking the data security sequences, a selection based on the information contents can be performed subsequently, wherein only the data security sequences of the selected vehicle-to-X messages are checked. A decision to check the vehicle-to-X messages of vehicle 32, 34 and 37 is made on the basis of the information contents of the received vehicle-to-X messages. The vehicle-to-X message from vehicle 32 is selected because this vehicle is driving in front of vehicle 33 and hence constitutes a potential collision partner. The vehicle-to-X message from vehicle 34, on the other hand, is selected because of the spatial proximity to vehicle 33, and the vehicle-to-X message from vehicle 37 is selected because vehicle 37 is approaching crossroads 31 at relatively high speed and has right of way over vehicle 33, whereby vehicle 37 likewise constitutes a potential collision partner for vehicle 33.

According to a further example shown in FIG. 3, vehicle 32 is likewise equipped with the vehicle-to-X communication system according to the invention and additionally with surround sensors in the form of radar sensor and stereo-camera sensor. Vehicle 32 receives cooperative awareness messages from vehicles 33, 34, 35, 36 and 37. Owing to the available checking capacity, however, only the data security sequences of a maximum of three received vehicle-to-X messages can be checked per operating cycle. A piece of information about vehicle 33 is detected by the backward-pointing radar sensor, and a piece of information about vehicle 35 is detected by the forward-pointing stereo-camera sensor. The information contents of the information detected by the stereo-camera sensor and the radar sensor are compared with the information contents of the cooperative awareness messages from vehicles 33 and 35. Since the information contents match, the cooperative awareness messages from vehicles 33 and 35 are not selected but forwarded directly to the relevant driver assistance systems and processed by same. The data security sequences of the cooperative awareness messages from vehicles 34, 36 and 37 are then checked.

According to an exemplary embodiment of the invention, which is not shown, a vehicle is equipped with a large number of surround sensors. The information contents of the vehicle-to-X messages from senders that are spatially close and not hidden by obstructions can hence be compared with the information contents of the information detected by the surround sensors. These vehicle-to-X messages are therefore not selected. Vehicle-to-X messages from objects that are far away or hidden, on the other hand, cannot be detected by the surround sensors. A comparison with the information contents of the information detected by the surround sensors is accordingly not possible and these vehicle-to-X messages are selected.

In a further exemplary embodiment, which is not shown, a vehicle is likewise equipped with a large number of surround sensors. Most of the information contents of the received vehicle-to-X messages from the immediate surroundings can hence be compared. Since, however, two vehicle-to-X messages each comprise an information content that cannot be compared with information contents of the information detected by the surround sensors, these vehicle-to-X messages are selected and checked. The first vehicle-to-X message that cannot be compared is the length of a traffic-light phase, and the second vehicle-to-X message that cannot be compared is the number of vehicle occupants of a vehicle in front.

According to a further exemplary embodiment, which is not shown, a vehicle receives a number of vehicle-to-X messages, of which one group describes a traffic jam and another group describes a set of roadworks. Since there is insufficient checking capacity available, however, to check all these vehicle-to-X messages, random vehicle-to-X messages are selected from both groups by a statistical selection method and checked. The reliability of the unchecked vehicle-to-X messages in the same group that likewise describe the traffic jam or set of roadworks is inferred from the reliability assessment of the checked vehicle-to-X messages. Since these unchecked messages contain the same information content, it can be assumed that they are reliable.

According to an exemplary embodiment, which is likewise not shown, a vehicle receives a number of vehicle-to-X messages, of which only one message is selected on the basis of the information content thereof. Therefore checking capacity is still available for further checks. In order to utilize in full the available checking capacity and to leave no checking capacity unused, further vehicle-to-X messages are selected by the selection correction from the number of vehicle-to-X messages received in total in the current operating cycle.

In a further exemplary embodiment, which is likewise not shown, a vehicle receives a number of vehicle-to-X messages, of which a subset is selected on the basis of the information contents thereof. This subset, however, exceeds the available checking capacity. Therefore a selection correction takes place that takes into account a plurality of vehicle-to-X messages received in the same operating cycle from a specific sender, i.e. only one vehicle-to-X message is selected per sender and per operating cycle. Since the available checking capacity would still be insufficient to check all the selected vehicle-to-X messages, then the reliability assessments of vehicle-to-X messages from the specific sender that were checked in a previous operating cycle are taken into account to exclude further vehicle-to-X messages from the check if these messages were assessed as reliable. The same procedure is followed with further senders from which vehicle-to-X messages have already been checked in one of the three previous operating cycles. The selected subset is thereby reduced to such an extent that it corresponds to the available checking capacity and is neither greater than nor less than this capacity.

While the above description constitutes the preferred embodiment of the present invention, it will be appreciated that the invention is susceptible to modification, variation, and change without departing from the proper scope and fair meaning of the accompanying claims.

The invention claimed is:

1. A method for selectively checking data security sequences of received vehicle-to-X messages, the vehicle-to-X messages being messages containing information that is sent to a vehicle from another road user or an infrastructure facility, the method comprising the steps of:
   receiving or sending a number of the vehicle-to-X messages in an operating cycle of a vehicle-to-X communication system, wherein at least one of the vehicle-to-X messages comprises a data security sequence,
   checking the data security sequence during the operating cycle by performing a reliability assessment of the at least one of the vehicle-to-X messages received,
   reading during the operating cycle an information content of the received vehicle-to-X message without prior checking of the data security sequence,
   selecting during the operating cycle a subset of a number of the received vehicle-to-X messages on the basis of the information contents,
   correcting during the operating cycle the selection of the subset of the number of vehicle-to-X messages selected on the basis of the information content is greater than or less than the available checking capacity,
   checking solely the data security sequences of selected vehicle-to-X messages; and
   wherein the selection on the basis of the information contents takes into account at least two of the following factors:
      an actual speed of a recipient,
      a relative speed of the recipient with respect to a sender,
      an activation status of a driver assistance system or a comfort system,
      a distance between the recipient and sender,
      an estimated time of entry of the sender into a critical zone around the recipient wherein the critical zone has an adaptable extent and outline,
      an estimated time of intersection of the trajectories of motion of the sender and the recipient,
      an estimated time of the recipient colliding with the sender,
      an orientation of the recipient with respect to the sender,
      a time stamp of a vehicle to X message,
      a relative direction of travel of the recipient with respect to the sender, and
      a road classification is made according to one or more of a permitted maximum speed, a lane width, a separation of lanes, a number of lanes, a proximity to built-up areas, and weather conditions.

2. The method as claimed in claim 1 further comprising in that the selection on the basis of the information contents takes into account a comparison of the information contents with information content of information detected by at least one surround sensor, wherein a vehicle-to-X message of the messages having information contents which match the information contents of information detected by the at least one surround sensor are not selected.

3. The method as claimed in claim 1 further comprising in that the selection on the basis of the information content takes into account an intervention in a vehicle control system that will be actuated by a processing of the vehicle-to-X messages, wherein the vehicle-to-X messages that causes an intervention in the vehicle control system on being processed is always selected.

4. The method as claimed in claim 1 further comprising in that the selection on the basis of the information contents takes into account a driver warning that will be actuated by a processing of the vehicle-to-X messages, wherein the vehicle-to-X messages that causes a warning on being processed is always selected.

5. The method as claimed in claim 1 further comprising in that the data security sequences are generated and allocated based on an infrastructure for generating and allocating public keys, wherein the data security sequences are encrypted by an elliptic curve algorithm.

6. The method as claimed in claim 1, wherein the selection correction fully utilizes an available checking capacity of the vehicle-to-X communication system.

7. The method as claimed in claim 6, further comprising in that the selection correction based on a statistical selection method takes into account at least one of the following factors:

a reception of more than one of the vehicle-to-X messages from a specific sender in the same operating cycle,
a result of the reliability assessment of at least one of the vehicle-to-X messages from the specific sender in at least one previous operating cycle,
wherein on receiving more than one of the vehicle-to-X messages from the specific sender, not all of the vehicle-to-X messages from the specific sender are selected in the operating cycle, and wherein, depending on the result of the reliability assessment of at least one of the vehicle-to-X messages from the specific sender in at least one previous operating cycle, at least one of the vehicle-to-X messages received in the operating cycle from the specific sender is not selected.

8. The method as claimed in claim 1 further comprising in that the received vehicle-to-X messages are forwarded to at least one driver assistance system and processed, wherein the at least one driver assistance system is designed to at least one of warn a driver, intervene in the vehicle control system, and to override a driver instruction.

9. A vehicle-to-X communication system for selectively checking data security sequences of received vehicle-to-X messages, the vehicle-to-X messages being messages containing information that is sent to a vehicle from another road user or an infrastructure facility, comprising:
a sending module configured to send the vehicle-to-X messages, wherein the vehicle-to-X messages each form a data security sequence,
a receiving module configured to receive the vehicle-to-X messages,
a readout module configured to read information contents of the received vehicle-to-X messages without prior checking of the data security sequence during an operating cycle, and
a checking module configured to check during the operating cycle a reliability assessment of the received vehicle-to-X messages by checking the one data security sequence in each of the messages,
a selection module configured to select during the operating cycle a subset of the number of the received vehicle-to-X messages on the basis of the information contents,
a selection correction module configured to correct during the operating cycle the selection of the subset of the number of vehicle-to-X messages selected on the basis of the information content is greater than or less than the available checking capacity,
the checking module configured to check solely the data security sequences of selected vehicle-to-X messages, and
wherein the selection module on the basis of the information contents is configured to take into account at least two of the following factors:
an actual speed of a recipient,
a relative speed of the recipient with respect to a sender,
an activation status of a driver assistance r system or a comfort system,
a distance between the recipient and sender,
an estimated time of entry of the sender into a critical zone around the recipient wherein the critical zone has an adaptable extent and outline,
an estimated time of intersection of the trajectories of motion of the sender and the recipient,
an estimated time of the recipient colliding with the sender,
a time stamp of a vehicle to X message,
an orientation of the recipient with respect to the sender,
a relative direction of travel of the recipient with respect to the sender, and
a road classification is made according to one or more of a permitted maximum speed, a lane width, a separation of lanes, a number of lanes, a proximity to built-up areas, and weather conditions.

10. The system as claimed in claim 9, further comprising in that at least one of the sending module, the receiving module, the readout module, and the selection module comprise a shared chipset forming a shared processing unit.

11. The system as claimed in claim 9 further comprising in that at least one of the processing unit of the sending module, the receiving module, the readout module, and the selection module is assigned to a driver assistance system or a vehicle control unit.

12. The system as claimed in claim 9 further comprising in that the checking module comprises a processing unit having a dedicated design configured for checking cryptographic algorithms based on elliptic curves.

13. The system as claimed in claim 9 further comprising in that at least one of the sending module, and the receiving module is designed to send or receive the vehicle-to-X messages by means of at least one of the following connection types:
a WLAN connection,
ISM connection,
a Bluetooth® connection,
a ZigBee connection,
a UWB connection,
a WiMax® connection,
an infrared connection, and
a mobile communication connection.

14. The system as claimed in claim 9 incorporated into a motor vehicle.

* * * * *